United States Patent [19]

Lehmann et al.

[11] Patent Number: 4,546,221

[45] Date of Patent: Oct. 8, 1985

[54] DRAW-OUT SWITCHGEAR HAVING IMPROVED DISCONNECT CONTACTS

[75] Inventors: Jean-Marc Lehmann, Eybens; Raymond Soboul, Autrans; Marcel Macaire, Saint-Engrève, all of France

[73] Assignee: Merlin Gerin, Grenoble, France

[21] Appl. No.: 584,898

[22] Filed: Feb. 29, 1984

[30] Foreign Application Priority Data

Mar. 2, 1983 [FR] France .................... 83 03537

[51] Int. Cl.⁴ .................. H01H 1/50; H01H 9/00
[52] U.S. Cl. .................. 200/50 AA; 200/258; 200/287; 200/290
[58] Field of Search .......... 200/50 AA, 258, 259, 200/287, 290

[56] References Cited

U.S. PATENT DOCUMENTS

| | | | |
|---|---|---|---|
| 1,801,114 | 4/1931 | Schwennker | 200/258 |
| 2,426,387 | 8/1947 | Cashwell | 200/290 |
| 3,602,680 | 8/1971 | Hodgson . | |
| 3,617,673 | 11/1971 | Weston | 200/287 |
| 3,678,237 | 7/1972 | Rickert et al. | 200/259 |
| 4,121,067 | 10/1978 | Rexroad et al. | 200/50 AA |
| 4,476,361 | 10/1984 | Masaki et al. | 200/50 AA |

FOREIGN PATENT DOCUMENTS

| | | |
|---|---|---|
| 662433 | 2/1965 | Belgium . |
| 1073575 | 1/1960 | Fed. Rep. of Germany . |
| 2266285 | 10/1975 | France . |
| 2496334 | 6/1982 | France . |

*Primary Examiner*—Robert S. Macon
*Attorney, Agent, or Firm*—Parkhurst & Oliff

[57] ABSTRACT

The invention concerns a draw-out circuit-breaker having high electrical performances.

Each draw-in terminal clamp comprises at least one U-shaped guiding slide operating in conjunction with the edge of the associated contact terminal stab to lock the terminal clamp in the engaged position in a plane perpendicular to the engagement direction. A radiator is fitted inside the insulated enclosure secured to the bell-shaped cover.

5 Claims, 8 Drawing Figures

DRAW-OUT SWITCHGEAR HAVING IMPROVED DISCONNECT CONTACTS

BACKGROUND OF THE INVENTION

1. Field of the Invention

This invention relates to an electrical switchgear, and more particularly to a draw-out circuit-breaker having a pair of disconnect contacts of the type including contact fingers taking the form of a terminal clamp. Each terminal clamp is fitted at the end of a conductor to operate in conjunction with a fixed contact terminal star substantially aligned with the terminal clamp in the engagement direction. Each terminal clamp is fitted with a conductor support fixed to the terminal face of the corresponding conductor, and at least a pair of elementary contact fingers associated with an elastic self-tightening system.

2. Description of Related Art

A draw-out high voltage circuit-breaker has to meet different electrical and mechanical endurance requirements. The preponderant influence of electrodynamic forces must be taken into consideration for high performance circuit-breakers. It is standard practice to fit the draw-out circuit breaker support chassis with a notching and/or securing system designed to counteract the mechanical stresses due to electrodynamic forces, in order to avoid the disconnecting carriage recoil. In the engaged position, the disconnect contacts fitted at the ends of the connectors of each pole nevertheless remain under the influence of mechanical stresses resulting from the vertical component of electrodynamic forces that tend to lift the pin and the associated connector.

One of the first aims of the present invention is to improve the mechanical resistance in the engaged position of a high performance circuit-breaker subjected to the influence of strong electrodynamic forces.

SUMMARY OF THE INVENTION

The circuit-breaker according to the invention comprises contact fingers mounted on the fixed conductor support by means of a mechanical connection enabling in the retracted position a relative movement of the fingers in relation to the engagement direction and guiding parts operation in conjunction with an interconnected positioning system to lock the terminal clamp in the engaged position in all directions other than the engagement direction.

The guiding parts comprise at least a fixed slide fitted on the same side of the terminal clamp and having a U-shaped profile which delimits a longitudinal guiding passage juxtaposed with the engagement area provided between the elementary contact fingers of the terminal clamp. The positioning system is advantageously formed by the associated contact terminal stab the edge of which enters the guiding passage of the slide during engagement travel. Each slide is insulated and has no current flowing through it. The conductor support of the terminal clamp as a T-shaped structure comprising a coupling connector designed to be fixed to the conductor terminal face in two distinct directions corresponding respectively to horizontal or vertical engagement of the terminal clamp on a contact terminal stab arranged either flat or edgewise, and a central branch bearing the elementary contact fingers of the terminal clamp and the U-shaped guiding slide, the latter being joined to the narrowest face of the branch.

It is noted that in the circuit-breaker engaged position, the fixed contact terminal stab engagement in the passage constitutes an efficient mechanical connection at the level of each draw-in terminal clamp of the different poles. The blocking effect of the terminal clamp can be strengthened by providing two symmetrical slides bordering the terminal clamp laterally and separated one from the other by a gap corresponding to the contact terminal stab width allowing for clearance.

Another aim of the invention consists of improving the electrical performances of the circuit-breaker, each pole of which comprises a sealed enclosure filled with SF6 insulating gas and containing separable contacts and a self-blowing device.

According to one characteristic of the invention, the fixed arc contact is hollow, and a radiator for cooling ionized gases is fitted in the upper part of the sealed enclosure between said arc contact and the bell-shaped cover. The radiator is advantageously secured by a screw in an insert of the cover. The ionized gases escaping through the fixed arc contact are thus efficiently cooled, so as to avoid a possible repeat disruption in the arc area.

According to another characteristic of the invention, the main fixed contact is fitted with an insulating separating device located at a predetermined point on the pivoting movable contact path, so as to cause during closing travel a preliminary separation of the terminal contact contact fingers before the fingers are definitively inserted on the fixed main conduct.

The presence of the insulating separating device avoids braking and a possible rebounding of the movable main contact due to electrodynamic forces during circuit-breaker closing. In the case of a multiple-pin movable main contact, it enables the pins to come into contact with the fixed main contact fingers simultaneously.

BRIEF DESCRIPTION OF THE DRAWINGS

Other advantages and objectives will become more apparent from the description that follows of an implementation of the invention, given as a non-limiting example and shown in the appended drawings, in which.

DESCRIPTION OF THE PREFERRED EMBODIMENTS

Figure 1:
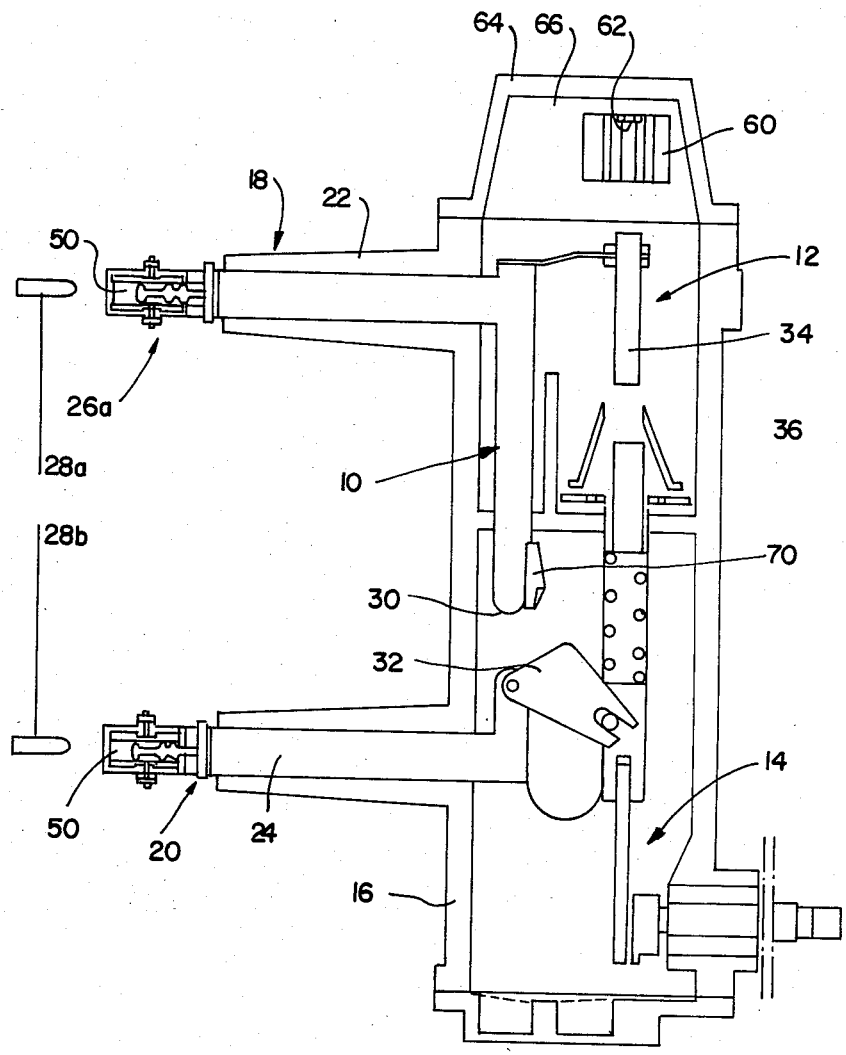
FIG. 1 is a cross-sectional view of a circuit-breaker pole according to the invention.
Figure 2:
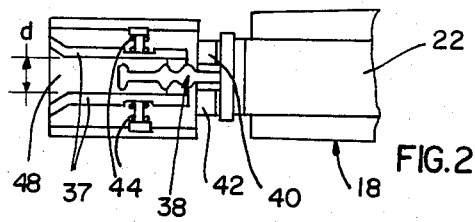
FIGS. 2 and 3 are partial views on an enlarged scale of FIG. 1, showing respectively a cross-sectional and top side view of a draw-in pin according to the invention.
Figure 4:
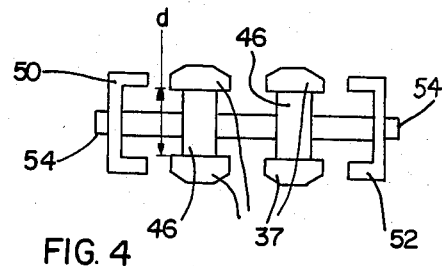
FIGS. 4 and 5 represent side elevational views of FIG. 2, respectively in engaged and retracted positions.
Figure 3:
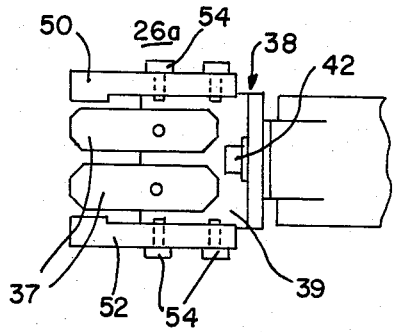

The invention is described hereafter as being applied to a draw-out puffer circuit-breaker pole of the type described in U.S. Pat. No. 4,309,581. FIG. 1 illustrates the main rated current flow circuit 10, the auxiliary shunting circuit 12 for arc breaking, the movable assembly operating mechanism 14 and the elongated cylinder-shaped insulating enclosure 16 filled with high dielectric strength insulating gas, in particular sulphur hexafluoride.

A pair of draw-in bushings 18, 20 includes an upper connector 22 and a lower connector 24 extending perpendicularly to the axis of enclosure 16. The end of each connector 22, 24 is fitted with a draw-in terminal clamp 26a, 26b operating in conjunction with a fixed contact terminal stab 28a, 28b when the circuit-breaker is inserted to connect up to a bushbar.

Main circuit 10 and auxiliary arc circuit 12 are connected in parallel to connectors 22, 24 inside enclosure 16. Main circuit 10 extends along the shortest straight-line path between the two connectors 22, 24, and auxiliary circuit 12 is arranged in parallel and a short distance from main circuit 10. The separation area of main contacts 30, 32 inside enclosure 16 is kept well apart from the separation area of arc contacts 34, 36 in order to avoid an interaction of main and auxiliary breaks.

Draw-in terminal clamp 26a, 26b of each pole present identical structures, and only one of them will be described in detail hereafter in reference to FIGS. 2 to 5. The terminal clamp 26a is formed by at least one pair of contact fingers 37 mounted with a certain clearance on a T-shaped conductor support 38 the coupling connector 40 of which is fixed to the terminal face of connector 22 by two fixing screws 42. Contact fingers 37 of each pair overhang the opposite faces of the central branch 39 perpendicular to fixed support 38 coupling connector 40. Two compression springs 44 exert pressure on the external faces of the two contacts 37 elastically pushed towards each other up to a minimum clearance d (FIGS. 2 and 4) determined by an intercalated stop 46 located between the internal faces of contact fingers 37. The terminal clamp 26a is disposed horizontally and comprises as an example two parallel pairs of contacts 37 juxtaposed crosswise on the central branch 39 of support 38, but it is understood that a different number of pairs of contacts 37 can be used depending on the rating chosen. Terminal clamp 26a seating 48 is widened to facilitate its insertion (arrow F, in FIG. 1) by translation onto the fixed contact terminal stab 28a. Such a draw-in terminal clamp is well-known to specialists.

Figure 5:
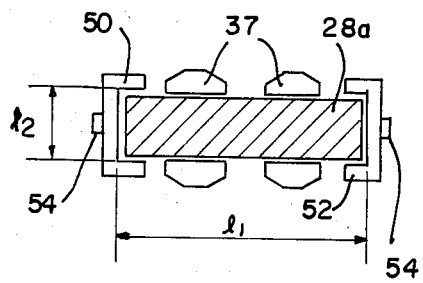

According to the invention, horizontal draw-in terminal clamp 26a (FIGS. 1 to 5) comprises a pair of U-shaped lateral guiding slides 50, 52, disposed horizontally on either side of contact fingers 37. Slides 50, 52, are symmetrical in relation to the mid-plane of support 38, and secured to the latter by fixing screws 54 inserted in the opposite edges of central branch 39. The transverse distance $l_1$ between the parallel bodies of the two slides 50, 52, and the distance $l_2$ vertically separating the curved wings of the U of each slide are slightly greater than the dimensions of horizontal contact terminal stab 28a (FIG. 5). Slides 50, 52 are made of metallic material, in particular a non-magnetic metal, covered with an insulating coating. The two slides 50, 52 remain fixed in relation to support 38, whereas contact fingers 37 can center themselves when engagement takes place.

In the retracted position (FIGS. 1 and 4) the mininum clearance d between contact fingers 37 constituting each pair is smaller than the distance $l_2$ between the wings of each slide.

At the beginning of engagement travel, the two guiding slides 50, 52 are engaged on the opposite sides of horizontal contact terminal stab 28a to ensure that terminal clamp 26a centers itself beforehand in the engagement direction. Contact fingers 37 then spread apart against the compressive action of springs 44 as engagement travel continues. In the terminal clamp 26a engaged position (FIG. 5), contact terminal stab 28a is held captive between the two slides 50, 52. The mechanical stresses due to electrodynamic forces or to external impacts are absorbed by fixed slides 50, 52 and terminal clamp 26a remains motionless as it is blocked in the transverse and vertical directions.

Figure 6:
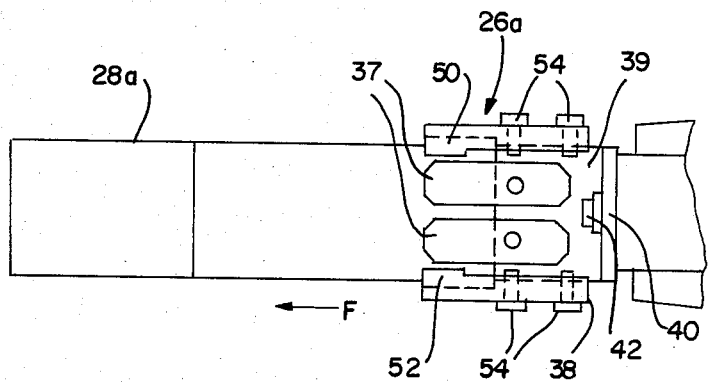
FIG. 6 is a similar view to FIG. 2 showing a production variant.
Figure 7:
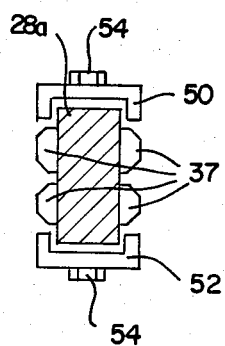
FIG. 7 is a side elevational view of FIG. 6 in pin engaged position.

Referring to FIGS. 6 and 7, the orientation of draw-in terminal clamp 26a is different from that of the device in FIGS. 1 to 5, due to the 90-degree pivoting of the terminal clamp 26a and slides 50, 52 assembly. Terminal clamp 26a extends in a vertical plane and operates in conjunction with a vertical contact terminal stab 28a when engagement takes place. The presence of upper 50 and lower 52 slides ensures in a similar way self-centering of the terminal clamp and its blocking in the engaged position, and prevents the circuit-breaker from being lifted up by the action of strong electrodynamic forces. It also prevents lateral displacements due to electrodynamic forces between phases.

The influence of these electrodynamic forces proportional to the current is all the more great for high performance circuit-breakers having a high breaking capacity.

According to another characteristic of the invention, arc breaking by auxiliary circuit 12 is improved by the presence of radiator 60 cooling the gases ionized inside enclosure 16. Radiator 60 is located in the upper part of sealed enclosure 16 secured to it by screw 62 in an insert of cover 64 (FIG. 1). Cover 64 is bell-shaped delimiting an upstream volume 66 housing radiator 60. The latter is located on the path of ionized gases escaping towards upstream volume 66 through hollow fixed arc contact 34. The combined action of volume 66 and radiator 60 enables the path of the escaped gases to be lengthened and the gases to be cooled efficiently so as to make any repeat disruption between arc contacts 34, 36 impossible.

Figure 8:
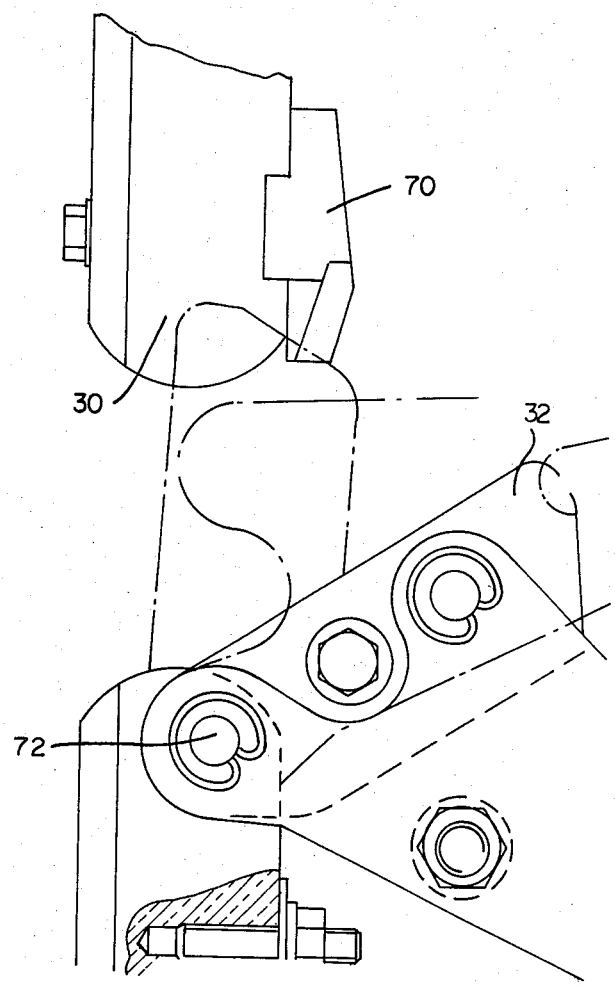
FIG. 8 shows, on an enlarged scale, a production detail of the main contacts in FIG. 1.

FIG. 8 shows the main contact 30, 32 system of circuit 10 in FIG. 1. An insulating separating device 70 is associated with fixed main contact 30, this device operating in conjunction with movable main contact 32 pin, mounted pivoting on a spindle 72. Separating device 70 protrudes beyond movable contact 32, so as to cause the pin contact fingers to separate during circuit-breaker closing before the fingers are definitively inserted on fixed main contact 30.

What we claim is:

1. A draw-out electrical switchgear having separable contacts and comprising:
   a pair of terminal clamps arranged at the ends of bushings in electrical connection with the separate contacts of said draw-out switchgear;
   a pair of fixed terminal stabs cooperating with said aligned terminal clamps in the engaged position of said switchgear;
   each terminal clamp having a conductive support member fixed to the end face of the corresponding bushing, and at least a pair of oppositely disposed contact fingers mounted on said fixed conductive support member to enable limited centering movement of said fingers;
   biasing means including springs which exert contact pressure on said contact fingers;
   a pair of lateral U-shaped slides symmetrically extending in relation to the mid-plane of each terminal clamp, and being rigidly fixed to said conductive support member on either side of said contact fingers so as to define a guiding passage parallel to the engagement direction;

said fixed terminal stab being inserted within said guiding passage, the distance separating the two slides generally corresponding to the width of the corresponding terminal stab so as to ensure the locking of the terminal clamp in the engaged position of said switchgear.

2. The switchgear according to claim 1, wherein each U-shaped slide has a central body secured to said support member by fixing means and two parallel wings disposed facing the side faces of the contact fingers of the corresponding terminal clamp.

3. The switchgear according to claim 2, wherein said conductive support member of each terminal clamp has a T-shaped structure comprising a central branch bearing said contact fingers and the U-shaped guiding slides which are secured to the narrowest face of said branch, and a coupling connector fixed to said end face of the associated bushing according to two distinct orientations corresponding respectively to horizontal and vertical engagement of the terminal clamp on a respective flat and edgewise contact terminal stab.

4. The switchgear according to claim 1, wherein said guiding slides are made of metallic material covered with an insulating coating.

5. The switchgear according to claim 4, wherein said metallic material is a non-magnetic metal.

* * * * *